United States Patent
Ancimer

(10) Patent No.: US 11,715,837 B2
(45) Date of Patent: Aug. 1, 2023

(54) SYSTEMS AND METHODS OF USING AN ENERGY STORAGE DEVICE TO ASSIST AN EJECTOR

(71) Applicant: CUMMINS INC., Columbus, IN (US)

(72) Inventor: Richard Ancimer, Toronto (CA)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 17/592,231

(22) Filed: Feb. 3, 2022

(65) Prior Publication Data

US 2022/0416269 A1   Dec. 29, 2022

Related U.S. Application Data

(60) Provisional application No. 63/215,087, filed on Jun. 25, 2021.

(51) Int. Cl.

| | |
|---|---|
| *H01M 8/04858* | (2016.01) |
| *H01M 8/043* | (2016.01) |
| *H01M 8/04701* | (2016.01) |
| *H01M 8/04746* | (2016.01) |
| *H01M 8/249* | (2016.01) |
| *H01M 16/00* | (2006.01) |
| *H01M 8/04955* | (2016.01) |
| *H01M 8/04223* | (2016.01) |
| *H01M 8/04537* | (2016.01) |

(52) U.S. Cl.
CPC ........ *H01M 8/0491* (2013.01); *H01M 8/043* (2016.02); *H01M 8/04701* (2013.01); *H01M 8/04753* (2013.01); *H01M 8/249* (2013.01); *H01M 16/006* (2013.01); *H01M 8/04223* (2013.01); *H01M 8/04574* (2013.01); *H01M 8/04582* (2013.01); *H01M 8/04589* (2013.01); *H01M 8/04895* (2013.01); *H01M 8/04902* (2013.01); *H01M 8/04955* (2013.01); *H01M 2250/20* (2013.01)

(58) Field of Classification Search
CPC .............. H01M 8/0491; H01M 8/043; H01M 8/04701; H01M 8/04753; H01M 8/249; H01M 8/04223; H01M 8/04225; H01M 8/04228; H01M 8/04302; H01M 8/04303; H01M 8/04552; H01M 8/04559; H01M 8/04582; H01M 8/04589; H01M 8/04611; H01M 8/04619; H01M 8/04708; H01M 8/04716; H01M 8/04761; H01M 8/04873; H01M 8/0488; H01M 8/04902; H01M 8/04932; H01M 8/0494; H01M 8/04955; H01M 16/006; H01M 2250/10; H01M 2250/20; H01M 2250/30
See application file for complete search history.

(56) References Cited

U.S. PATENT DOCUMENTS

| | | | | |
|---|---|---|---|---|
| 2007/0264548 A1* | 11/2007 | Yagi | ..................... | H01M 8/0432 |
| | | | | 429/430 |
| 2009/0053564 A1* | 2/2009 | Fellows | ............ | H01M 8/04291 |
| | | | | 429/410 |
| 2009/0181270 A1* | 7/2009 | Kamara | ............ | H01M 8/04626 |
| | | | | 429/411 |

(Continued)

*Primary Examiner* — Matthew W Van Oudenaren
(74) *Attorney, Agent, or Firm* — Barnes & Thornburg LLP

(57) ABSTRACT

The present disclosure generally relates to systems and methods for using an energy storage device to assist a venturi or an ejector in a fuel cell or fuel stack system.

20 Claims, 6 Drawing Sheets

(56) References Cited

U.S. PATENT DOCUMENTS

2013/0288148 A1* 10/2013 Kazuno ............. H01M 8/04619
  429/444
2015/0318565 A1* 11/2015 Ryu ................... H01M 8/0488
  429/430
2016/0380290 A1   12/2016 Okamoto et al.

* cited by examiner

SYSTEMS AND METHODS OF USING AN ENERGY STORAGE DEVICE TO ASSIST AN EJECTOR

CROSS-REFERENCE TO RELATED APPLICATIONS

This nonprovisional application claims benefit and priority, under 35 U.S.C. § 119(e) and any other applicable laws or statutes, to U.S. Provisional Patent Application Ser. No. 63/215,087 filed on Jun. 25, 2021, the entire disclosure of which is hereby expressly incorporated herein by reference.

TECHNICAL FIELD

The present disclosure relates to systems and methods of using an energy storage device to assist the operation of a venturi or an ejector in a fuel cell or fuel stack system.

BACKGROUND

Vehicles and/or powertrains use fuel cells or fuel cell stacks for their power needs. The fuel cell or fuel cell stacks may be any type of fuel cell. For example, the fuel cell and/or fuel cell stack may include, but are not limited to, a phosphoric acid fuel cell (PAFC), a molten carbonate fuel cell (MCFC), a proton exchange membrane fuel cell, also called a polymer exchange membrane fuel cell (PEMFC), and a solid oxide fuel cell (SOFC).

A fuel cell or fuel cell stack may generate electricity in the form of direct current (DC) from electro-chemical reactions that take place in the fuel cell or fuel cell stack. A fuel processor converts fuel into a form usable by the fuel cell or fuel cell stack. If the fuel cell or fuel cell stack is powered by a hydrogen-rich, conventional fuel, such as methanol, gasoline, diesel, or gasified coal, a reformer may convert hydrocarbons into a gas mixture of hydrogen and carbon compounds, or reformate. The reformate may then be converted to carbon dioxide, purified and recirculated back into the fuel cell or fuel cell stack.

Fuel, such as hydrogen or a hydrocarbon, is channeled through field flow plates to the anode on one side of the fuel cell or fuel cell stack, while oxygen from the air is channeled to the cathode on the other side of the fuel cell or fuel cell stack. At the anode, a catalyst, such as a platinum catalyst, causes the hydrogen to split into positive hydrogen ions (protons) and negatively charged electrons. In the case of a polymer exchange membrane fuel cell (PEMFC), the polymer electrolyte membrane (PEM) permits the positively charged ions to flow through the PEM to the cathode. The negatively charged electrons are directed along an external loop to the cathode, creating an electrical circuit (electrical current). At the cathode, the electrons and positively charged hydrogen ions combine with oxygen to form water, which flows out of the fuel cell or fuel cell stack.

Fuel stream is exhausted from a fuel cell or fuel cell stack outlet and recirculated back to the anode through an anode inlet. The recirculation of the fuel stream exhaust back to the anode inlet includes both fuel and water. The recirculation rate is based on specified excess fuel targets such as excess fuel ratio or entrainment ratio (ER). The entrainment ratio (ER) is defined as the ratio of the mass flow rate of the low pressure stream (e.g., the secondary mass flow rate) to the mass flow rate of the high pressure stream (e.g., the primary mass flow rate).

Fuel targets for a system may be specified as a minimum level of excess fuel required by the fuel cell or fuel cell stack based on the operating conditions of the fuel cell or fuel cell stack. A fuel cell or fuel cell stack may have an excess fuel level higher than the minimum level defined by the excess fuel target, but achieving that higher level may result in a high parasitic load on the fuel cell or fuel cell stack. For example, an excess fuel level higher than the minimum excess fuel level may be achieved by maintaining high fuel flow rates at the anode which may lead to pressure loss in the fuel cell or fuel cell stack. A blower and/or pump may function at a capacity proportional to the pressure loss in the fuel cell or fuel cell stack and/or to the volumetric flow rate through the blower and/or pump. A blower and/or pump may use additional power to compensate for the pressure loss. Use of additional power by the blower and/or pump may result in a high parasitic load on the fuel cell or fuel cell stack.

The present specification provides systems and methods of using an energy storage device to assist a venturi or an ejector in a fuel cell or fuel stack system during transient operations.

SUMMARY OF THE INVENTION

In one aspect, the present disclosure relates to a fuel cell stack system, comprising an ejector, a blower, a controller, and an energy storage device. The system is operating in a transient lag state.

In one embodiment, the system is required to operate at a first operating current density and the ejector or blower cannot support the first operating current density. In some embodiments, the controller determines a second operating current density for the system, and the second operating current density is higher than the first operating current density.

In one embodiment, temperature or pressure of the fuel cell stack is being decreased while the system is operating in the transient lag state.

In one embodiment, the system generates excess power when operating at the second operating current density, and wherein the excess power generated is dissipated or stored over a period of time in the energy storage device. In some embodiments, the storage device is a battery with a state of charge. In other embodiments, the storage of the excess power generated depends on the state of charge of the battery. In some embodiments, the excess power generated is stored as kinetic energy, potential energy, chemical energy, electrical energy, electrochemical energy, mechanical energy, or thermal energy.

In one embodiment, the controller determines a third operating current density for the system, and the third operating current density is lower than the first operating current density. In some embodiments, the system uses energy from the energy storage device when operating at the third operating current density.

In another aspect, the present disclosure relates to a method for operating a fuel cell stack system including an ejector, a blower, a controller, and an energy storage device. The method comprises determining an operating current density of the system, and operating the fuel cell stack in a transient lag state.

In one embodiment of the method, determining an operating current density of the system comprises determining a first operating current density such that the ejector or blower cannot support the first operating current density. In some embodiments of the method, the method further comprises the controller determining a second operating current density for the system, and wherein the second operating current density is higher than the first operating current density.

In one embodiment of the method, temperature or pressure of the fuel cell stack is being decreased while the system is operating in the transient lag state.

In one embodiment of the method, the method further comprises the system generating excess power when operating at the second operating current density, and dissipating the excess power generated or storing the excess power generated over a period of time in the energy storage device.

In some embodiments of the method, the storage device is a battery with a state of charge. In some embodiments of the method, storing the excess power generated depends on the state of charge of the battery. In some embodiments of the method, the excess power generated is stored as kinetic energy, potential energy, chemical energy, electrical energy, electrochemical energy, mechanical energy, or thermal energy.

In one embodiment of the method, the method further the controller determining a third operating current density for the system, and wherein the third operating current density is lower than the first operating current density.

In some embodiments of the method, the method further comprises the system using energy from the energy storage device when operating at the third operating current density.

BRIEF DESCRIPTION OF THE DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

The present disclosure relates to systems and methods of enhancing the operation of a venturi or ejector in a fuel cell or fuel stack system. More specifically, it relates to systems and methods of using a battery storage system to assist a venturi or ejector in a fuel cell or fuel stack system during transient operations.

Figure 1:
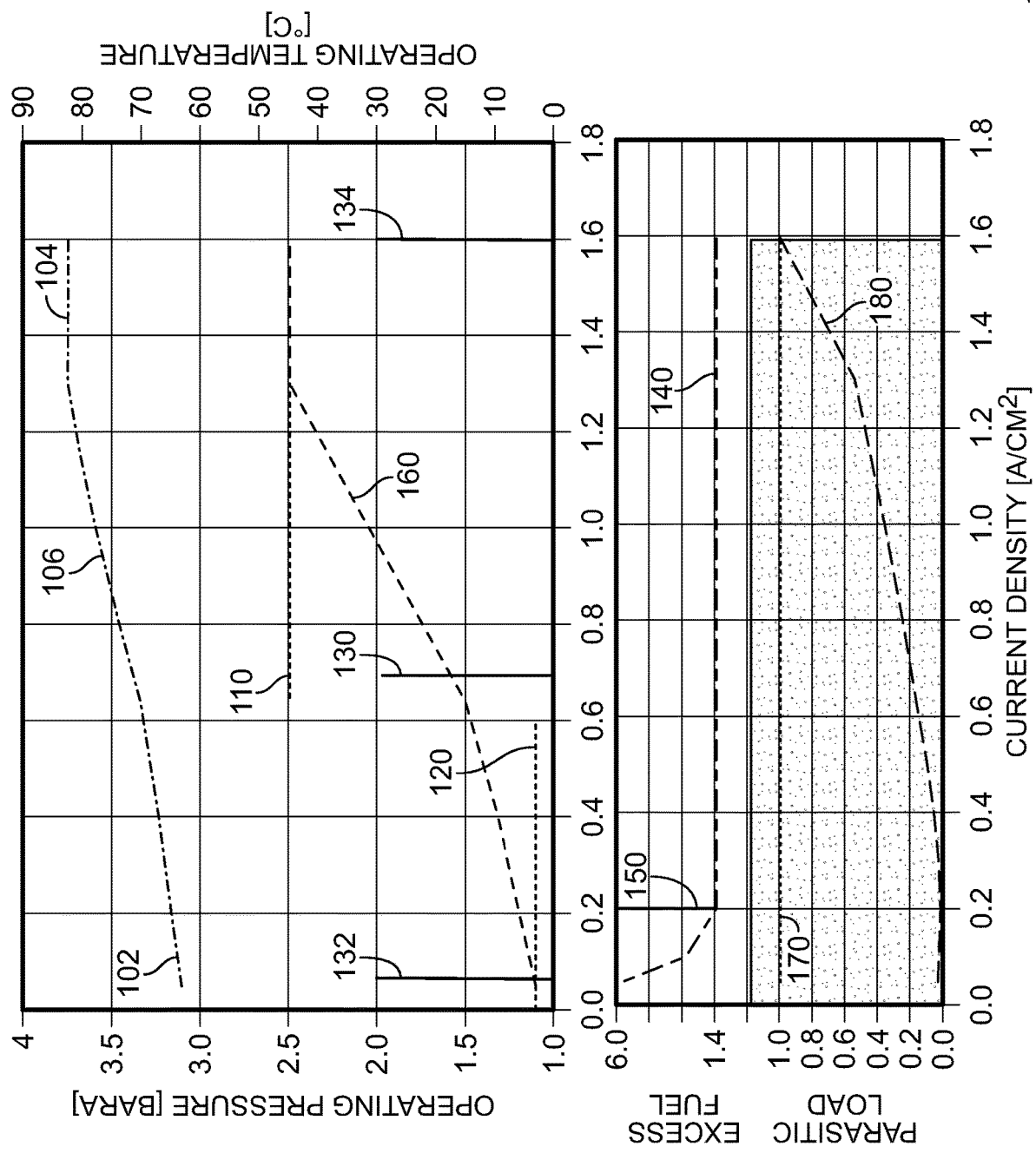
FIG. 1 is a graph showing the operating curves of as system comprising a fuel cell or fuel cell stack.

One embodiment of the requirements of the present operating system comprising a fuel cell or fuel cell stack is shown in FIG. 1. The operating pressures and the associated operating temperatures are shown as a function of current density. A fuel cell or fuel cell stack may be required to operate within a pressure range known as anode inlet manifold pressure ($P_{AIM}$).

The highest anode inlet manifold pressure of a fuel cell or fuel cell stack ($P_{AIM\_HI}$) is denoted by 110. The lowest anode inlet manifold pressure of a fuel cell or fuel cell stack ($P_{AIM\_LO}$) is denoted by 120. The range 160 between 110 and 120 indicates the target anode inlet manifold pressure range. In some embodiments, the target temperature of the system may range from a low fuel supply operating temperature ($T_{CV\_LO}$) 102 to a high fuel supply operating temperature ($T_{CV\_HI}$) 104.

In one embodiment, it is critical to operate the fuel cell or fuel cell stack at a pressure that ranges from about or approximately the highest anode inlet manifold pressure ($P_{AIM\_HI}$) 110 to about or approximately the lowest anode inlet manifold pressure ($P_{AIM\_LO}$) 120 when the fuel cell or fuel cell stack is operating above a critical current density ($i_{LO\_CR}$) 130. In some embodiments, the critical current density ($i_{LO\_CR}$) 130 may be at about 0.7 A/cm$^2$. In other embodiments, the critical current density ($i_{LO\_CR}$) 130 may be at about 0.6 A/cm$^2$. In some further embodiments, the critical current density ($i_{LO\_CR}$) 130 may be higher or lower than 0.7 A/cm$^2$, such as ranging from about 0.5 A/cm$^2$ to about 0.9 A/cm$^2$, including every current density comprised therein.

In one embodiment, the fuel cell or fuel cell stack may be operating at high current density range such as from about 1.3 A/cm$^2$ to about 2.0 A/cm$^2$, or about 1.3 A/cm$^2$ to about 1.6 A/cm$^2$, or about 1.0 A/cm$^2$ to about 1.6 A/cm$^2$. In some embodiments, operating the fuel cell or fuel cell stack at high current densities (e.g., at about 1.6 A/cm$^2$) with pressures and temperatures different from the optimal target operating pressure and temperature may lower the efficiency of the fuel cell or fuel cell stack. Doing so may also result in damage to the fuel cell or fuel cell stack because of MEA degradation (e.g., due to starvation, flooding and/or relative humidity effects). In some embodiments, there may be more flexibility in the fuel cell or fuel cell stack operating pressure and temperature when the fuel cell or fuel cell stack is operating below the critical current density ($i_{LO\_CR}$) 130. The present operating system comprising the fuel cell or fuel cell stack can operate at a minimum current density ($i_{MIN}$) 132 and a maximum current density ($i_{MAX}$) 134.

In one embodiment, the present system comprising a fuel cell or fuel cell stack may operate in a functional range that may be different than that indicated by the curve 160 in FIG. 1. In some embodiments, the operating system may function at higher pressures (e.g., highest anode inlet manifold pressure ($P_{AIM\_HI}$) 110) or at a current density as low as the critical current density ($i_{LO\_CR}$) 130. For example, the present system might extend steady state operation at about 2.5 bara all the way down to the critical current density ($i_{LO\_CR}$) 130. Pressure measurements in bara refer to the absolute pressure in bar.

In one embodiment, excess fuel may be provided at the anode inlet to avoid fuel starvation towards the anode outlet. The water content of the anode inlet stream or the relative humidity of the inlet stream may impact the performance and health of the fuel cell. For example, low inlet humidity may lead to a drier membrane electrode assembly (MEA), resulting in reduced performance. Low inlet humidity may also induce stresses that can lead to permanent damage to the membrane electrode assembly (MEA). High humidity levels may lead to flooding within the fuel cells, which can induce local starvation and/or other effects that may reduce fuel cell performance and/or damage the membrane electrode assembly (MEA). In some embodiments, there may be an optimal inlet relative humidity range in which fuel cell performance is improved and membrane electrode assembly (MEA)

degradation rate is minimized. For example, the fuel cell can achieve optimal performance when the anode inlet gas relative humidity levels is in the range of about 30% to about 35%.

In one embodiment, under normal operating conditions, the source of the excess fuel and water content in a fuel cell may be from recirculated anode gas. The composition of recirculated flow in the operating system is dependent on that of anode gas outlet. In some embodiments, the anode outlet gas may be saturated with water at a given anode gas outlet temperature and pressure. Thus, the composition of the recirculated flow may vary and should be taken into account when determining the required recirculation flow to meet the inlet anode gas excess fuel or relative humidity targets.

The required level of recirculation flow rate can be set by either the need for excess fuel, or for increased water content, whichever calls for higher recirculation flow. The required recirculation flow can be expressed as the target entrainment ratio (ER). Alternatively, a target effective excess fuel ratio or a minimum required fuel ratio may account for either the need for excess fuel, or the inlet anode water content. 'Excess fuel ratio' may be used to represent the required composition derived from the recirculation flow to meet the anode inlet gas requirement. The anode gas requirement may be the more stringent of excess fuel ratio or relative humidity requirements of the fuel cell system.

The minimum required excess fuel ratio as a function of current density is indicated by the line 140. Excess fuel ratio ($\lambda$) or the anode stoichiometry ratio is defined as the ratio of anode inlet fuel flow rate to the fuel consumed in the fuel cell or fuel cell stack. In some embodiments, the system requires a fuel amount at or above the minimum required fuel ratio level. In other embodiments, the operating system may require a target water or humidity level, which may affect the excess fuel ratio ($\lambda$). The excess fuel ratio ($\lambda$) may be flat across the system operating range except at low current densities, such as a current density at or below an excess fuel ratio current density threshold ($i_{\lambda\_THV}$) 150 or the excess fuel ratio ($\lambda$) may change with a change in the current density. In some embodiments, the excess fuel ratio ($\lambda$) above the excess fuel ratio current density threshold ($i_{\lambda\_THV}$) 150 may be range from about 1.3 to about 1.9, including any ratio comprised therein. In one preferable embodiment, the excess fuel ratio ($\lambda$) above the excess fuel ratio current density threshold ($i_{\lambda\_THV}$) 150 may be about 1.4 or about 1.6.

In some embodiments, the excess fuel ratio current density threshold ($i_{\lambda\_THV}$) 150 of the present system may be at or about 0.2 A/cm². In other embodiments, the excess fuel ratio current density threshold ($i_{\lambda\_THV}$) 150 may be at a different current density. For example, the excess fuel ratio current density threshold ($i_{\lambda\_THV}$) 150 may range from about 0.05 A/cm² to about 0.4 A/cm², including any current density comprised therein. In one preferable embodiment, the excess fuel ratio current density threshold ($i_{\lambda\_THV}$) 150 may be about 0.1 A/cm² or about 0.2 A/cm². The excess fuel ratio current density threshold ($i_{\lambda\_THV}$) 150 may depend on the operating conditions of the fuel cell or fuel cell stack.

In one embodiment, if the fuel cell or fuel cell stack is operating below the excess fuel ratio current density threshold ($i_{\lambda\_THV}$) 150, a minimum volumetric flow rate may be maintained through the anode to ensure that any liquid water that might form in the fuel cell or fuel cell stack may be flushed out of the fuel cell or fuel cell. In some embodiments, at low flow rates (e.g., below about 0.2 A/cm² or below about 0.1 A/cm²), there may be flooding in the fuel cell. In other embodiments, if the minimum volumetric flow rate is below the excess fuel ratio current density threshold ($i_{\lambda\_THV}$) 150, the rate of fuel cell or fuel cell stack degradation may increase.

In one embodiment, a venturi or ejector may be used in the present system. The venturi or ejector may be sized, such that the operating system may not require the assistance of a recirculation pump, such as a blower, at certain current densities. Absence of usage of the blower may result in a decrease in parasitic load, as shown by the curves 170 and 180 of FIG. 1. The curve 170 shows the fraction of flow that is delivered by the blower and/or recirculation pump without a venturi or ejector. The curve 180 shows the corresponding parasitic load. In some embodiments, the parasitic load may increase with an increase in current density, as shown by the curve 180, because the blower and/or recirculation pump may function at a capacity proportional to the pressure loss and the required recirculation flow rate in the fuel cell or fuel cell stack.

In some embodiments, a fuel cell or fuel cell stack may be initially operating at high current density, at high operating temperatures and pressures such that the fuel cell load under this initial operating condition is high. The fuel cell load is defined as:

Load=stack power=current×fuel cell or fuel cell stack voltage=current density×fuel cell area× fuel cell or fuel cell stack voltage In some embodiments, the fuel cell or fuel cell stack is in a load shedding state when the load demand for power is rapidly reduced or shed requiring the fuel cell or fuel cell stack to reduce the current delivered.

In one embodiment, during transient operations in a fuel cell or fuel cell stack, the operating pressure in the fuel cell or fuel cell stack may change based on the changes in the fuel cell or fuel cell stack temperature indicated by the curve 106. For example, during load shedding, the transient operating pressure ($P_{AIM\_TRS}$) may be greater than the steady state operating pressure ($P_{AIM\_SS}$). In some embodiments, the transient operating pressure ($P_{AIM\_TRS}$) may equal the highest anode inlet manifold pressure ($P_{AIM\_HI}$) 110 even at low current densities. During load acceptance, the rate of increase in current density is limited, and the steady state operating pressure ($P_{AIM\_SS}$) may equal the anode inlet manifold pressure ($P_{AIM}$).

In one embodiment, the operating pressure of a fuel cell or fuel cell stack indicated by the curve 160 may optimize the balance between enabling efficient fuel cell or fuel cell stack operation and the parasitic load required to operate at the chosen operating pressure (e.g., the parasitic load of an air compressor, a blower, and/or a pump). In some embodiments, the operating temperature indicated by the curve 106, operating pressure indicated by the curve 160, and/or excess air ratio may maintain a target relative humidity (RH) for the fuel cell or fuel cell stack operation. In other embodiments, the operating temperature indicated by the curve 106, operating pressure indicated by the curve 160, and/or excess air ratio may be determined by targeting a specific value for the relative humidity (RH) at the cathode.

The excess air ratio is defined similarly to excess fuel ratio, but refers to the cathode side flow (i.e., excess $O_2$ in the air). The combination of excess air ratio, pressure and temperature are used together to control humidity on the cathode side (which in turn impacts water content on the anode ($H_2$) side. In one embodiment, temperature, pressure, and excess air ratio that vary with current density may be used to control humidity. In some embodiments, excess air ratio is about 2.0. In other embodiments, excess air ratio is about 1.7 to about 2.1. In some other embodiments, excess air ratio is about 1.8 to about 1.9 under pressurized operation. Excess air ratio may increase to below a threshold current to keep volumetric flow rate high enough to prevent flooding in the fuel cell or fuel cell stack.

In some embodiments, the target relative humidity (RH) may be maintained by using a humidification device in combination with the operating pressure and operating temperature. For example, a humidification device may be used on the cathode side of a fuel cell or fuel cell stack. In other embodiments, if the target relative humidity (RH) and the target operating pressure for the fuel cell or fuel cell stack are specified, the target temperature for the fuel cell or fuel cell stack operation may be determined.

In one embodiment, a system comprising a fuel cell or fuel cell stack may comprise a control valve. In some embodiments, the control valve may be a mechanical regulator (e.g., a dome regulated mechanical regulator), a proportional control valve, or an injector. In other embodiments, the control valve may comprise an inner valve, coil, a solenoid, or a different mechanical element that controls the opening or closing of the control valve.

Figure 2:
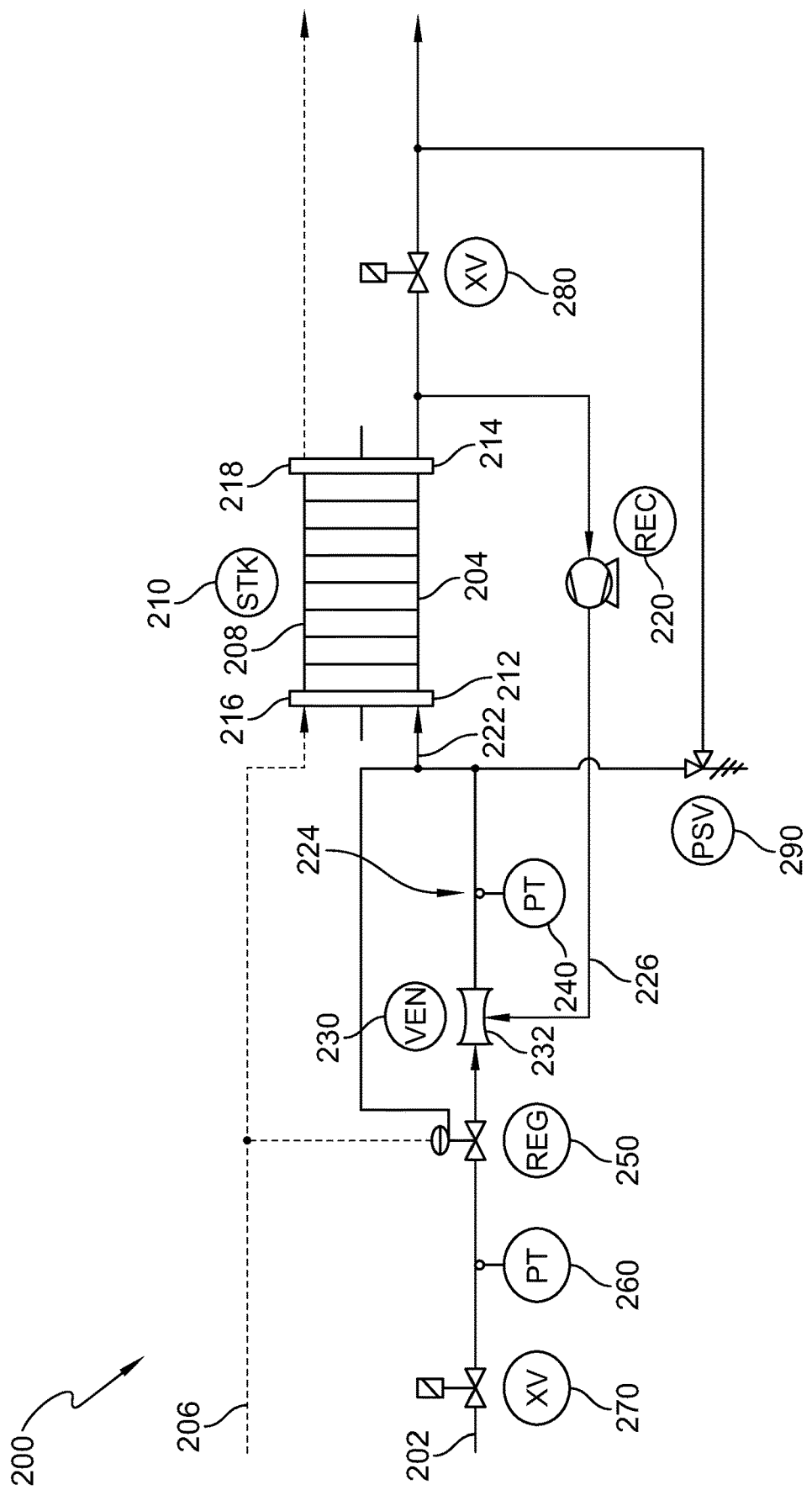
FIG. 2 is a schematic showing a mechanical regulator used along with a venturi or ejector in a fuel cell stack system.

FIG. 2 illustrates one embodiment of an operating system 200 comprising a fuel cell stack 210, a mechanical regulator 250, a recirculation pump or blower 220 in series or in parallel to the fuel cell stack 210, an exhaust valve 280, a shut off valve 270, a pressure transfer valve 290, one or more pressure transducers 240/260, and a venturi or ejector 230. In some embodiments, the present system 200 may comprise one or more fuel cell stacks or one or more fuel cells. In other embodiments, there may also be one or multiple valves, sensors, compressors, regulators, blowers, injectors, ejectors, and/or other devices in series or in parallel with the fuel cell stack 210.

In one embodiment of the present system 200, the anode inlet stream 222, flows through the anode 204 end of the fuel cell stack 210. Typically, the anode stream may be a mixture of fresh fuel (e.g., $H_2$) and anode exhaust (e.g., $H_2$ fuel and/or water). Conversely, oxidant 206 (e.g., air, oxygen, or humidified air) may flow through the cathode end 208 of the fuel cell stack 210.

In one embodiment, a mechanical regulator 250 may be used to control the flow of fresh fuel 202 also referred to as primary flow, primary mass flow, primary fuel, or motive flow to the anode 204. The pressure differential between the gas streams (e.g. fuel 222 and air 206) at the anode 204 and the cathode 208 may provide an input signal to a controller in the mechanical regulator 250. The controller of the mechanical regulator 250 may determine the flow of fuel 222 through the anode inlet 212 at the anode 204.

In some embodiments, the input signal from the anode and/or cathode of the fuel cell or fuel cell stack may be a physical signal. In other embodiments, the input signal may be a virtual or an electronic signal. In yet further embodiments, the signal may be any type of communicative or computer signal known in the art.

In one embodiment, the primary fuel flow rate or primary flow rate may be controlled to match the fuel consumption in the fuel cell stack 210 based on the operating pressure (e.g., anode pressure) being used as an intermediary signal. In some embodiments, the pressure in the anode 204 may stabilize when fuel consumption matches the fresh fuel feed at the anode 204 assuming that all other parameters are equal. Since the functioning of the mechanical regulator 250 is based on the pressure differential between the anode 204 and cathode 208, a target pressure differential needs to be maintained when using a mechanical regulator 250. In some embodiments, the pressure at the cathode 208 is controlled and/or maintained at a target level via cathode side controls.

In one embodiment, a mechanically regulated approach, such as by employing actuators, may use the pressure signals from cathode/air inlet 216 to control air mass flow and maintain the appropriate pressure on the cathode 208 side of the fuel cell stack 210. In some embodiments, pressure signals from cathode 208 side are inputs to the mechanical regulator 250. In some embodiments, the anode 204 side mass flow and anode 204 side pressure may be controlled by using the pressure signals from cathode 208 side and measuring one or more anode 204 side conditions.

In one embodiment, the pressure signals from cathode 208 side may change the position of a valve in the mechanical regulator 250 to control mass flow through the mechanical regulator 250 and maintain the target pressure differential between the anode 204 and the cathode 208. In other embodiments, the input signal that acts on the mechanical regulator 250 is effectively a pressure differential that acts on a diaphragm or other parts of the mechanical regulator 250. No other direct measurement of the pressure differential must be undertaken. For example, the single point pressure at the anode 204 may be calculated to be the cathode 208 side pressure plus the pressure differential between the gas streams at the anode 204 and the cathode 208. Single point pressure may be absolute pressure or gauge pressure.

In one embodiment, the venturi or ejector 230 may draw a secondary flow (entrainment flow or recirculation flow) 226 the anode gas recirculation (AGR) loop 224. In some embodiments, the anode gas recirculation loop 224 may include the venturi or ejector 230, fuel cell stack 210, a secondary inlet 232 in a suction chamber in the venturi or ejector 230, and/or other piping, valves, channels, manifolds associated with the venturi or ejector 230 and/or fuel cell stack 210. In other embodiments, the recirculation pump or blower 220 may increase or decrease the differential pressure across the anode gas recirculation (AGR) loop 224.

In one embodiment, the venturi or ejector 230 may draw a secondary flow 226 also referred to as secondary mass flow, entrainment flow, or recirculation flow, using a flow pressure across the anode gas recirculation (AGR) loop 224. In some embodiments, as discussed later, the venturi or ejector 230 may take advantage of the available excess exergy from the higher pressure primary flow to draw in the secondary flow 226, working against the pressure losses through the AGR loop 224. In some embodiments, the AGR loop 224 may include the venturi or ejector 230, fuel cell stack 210, a secondary inlet 232 in a suction chamber in the venturi or ejector 230, and/or other piping, valves, channels, manifolds associated with the venturi or ejector 230 and/or fuel cell stack 210. In other embodiments, the recirculation pump or blower 220 may increase or decrease the differential pressure across the AGR loop 224.

In one embodiment, the system 200 may require a target water or humidity level, which may drive the saturated secondary flow 226. The saturated secondary flow 226 may then drive the primary flow 202, such that the target excess fuel ratio ($\lambda$) may be dependent on the target water or humidity level.

In one embodiment, the recirculation pump or blower 220 may be used to achieve the excess fuel ratio. In some embodiments, the recirculation pump or blower 220 may operate across the entire operating range (current density) of the fuel cell stack 210. In other embodiments, the parasitic load of the recirculation pump or blower 220 may be substantial. In one embodiment, a large recirculation pump or blower 220 may be required to provide the power to achieve the excess target fuel ratio. In some embodiments the use of the recirculation pump or blower 220 may be inefficient and expensive. In some embodiments, operating characteristics of a recirculation pump or blower 220 may be distinct from a venturi or ejector 230.

In one embodiment, the pressure lift capability of the recirculation pump or blower 220 ($\Delta P_{BLWR}$) is function of the flow through the recirculation pump or blower 220 (Q), the blower speed (N), and the density of the flow composition ($\rho$). In some embodiments, the pressure lift of the recirculation pump or blower 220 ($\Delta P_{BLWR}$) may be limited by power draw limits and/or speed limit of the system 200/300. In one embodiment, when the recirculation pump or blower 220 is not spinning or under other system 200/300 stall conditions, the recirculation pump or blower 220 may act as a restriction in the AGR loop.

$$\Delta P_{BLWR} = f(Q, N, \rho)$$

Figure 3:
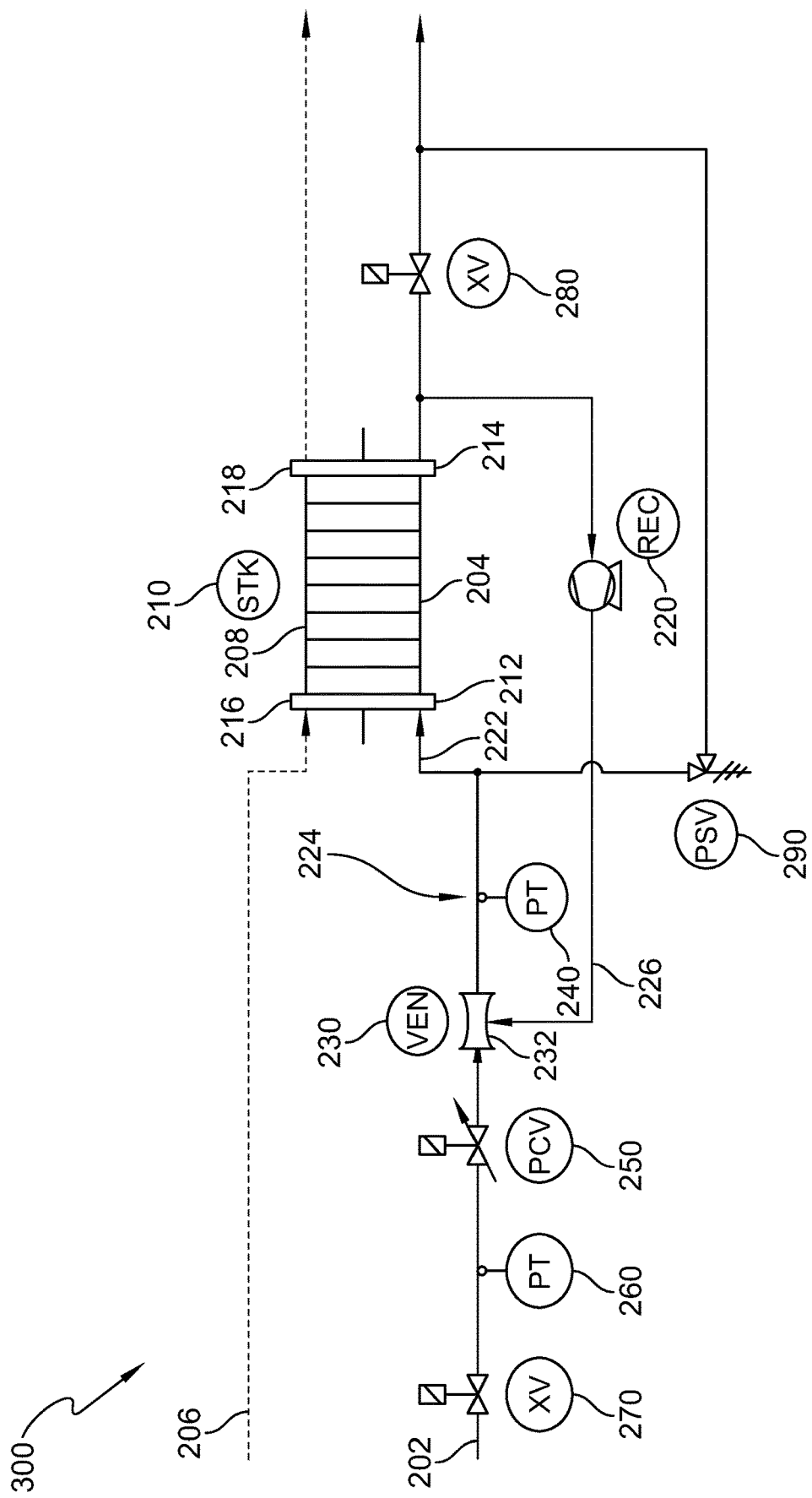
FIG. 3 is a schematic showing a proportional control valve used along with a venturi or ejector in a fuel cell stack system.

In one embodiment, as illustrated in the operating system 300 shown in FIG. 3, a proportional control valve 310 may be used instead of a mechanical regulator 250. A proportional control valve 310 is electronically controlled and may provide more flexibility in controlling the single point pressure at the anode 204 than mechanical regulator 250. In one embodiment, the proportional control valve 310 may be used to control the primary flow in an operating system 300. In other embodiments, an injector (not shown) may be used instead of a proportional control valve 310.

For example, the proportional control valve 310 may beneficially allow for active management of the differential pressure, may avoid droop issues, and/or provide flexibility in operating the fuel cell stack 210 under different operating conditions. Illustrative operating conditions may include, but are not limited to operating current density, operating pressure, operating temperature, operating relative humidity, fuel supply pressure, fuel supply temperature, required secondary flow, entrainment ratio, parasitic load limitations, power needs, pressure loses in the AGR loop 224, venturi or ejector 230 performance and/or efficiency, recirculation pump or blower 220 performance and/or efficiency, fuel density, purge flow, and choked or unchoked (e.g., not choked) flow conditions.

The turn down ratio of a system 200/300 is defined as the ratio of the maximum capacity of the venturi or ejector 230 to the minimum capacity of the venturi or ejector 230. In one embodiment, the venturi or ejector 230 may draw the recirculation flow 226 using a primary flow exergy. The turn down ratio characterizes the range over which the venturi or ejector 230 can deliver the required excess fuel ratio to the fuel cell stack 210. In one embodiment, the present operating system 200/300 may be designed to maximize the venturi or ejector 230 turn down ratio. Consequently, maximizing the turn down ratio of the venturi or ejector 230 also works to minimize the size and parasitic load associated with the recirculation pump or blower 220. In some embodiments, the venturi or ejector 230 may be required to operate and/or perform robustly to deliver the required primary flow 202 at the required excess fuel ratio.

In one embodiment, a fuel supply system may supply fuel at a fuel supply pressure ($P_{CV}$) and a fuel supply temperature ($T_{CV}$). In some embodiments, the sizing pressure ($P_{CV\_MIN}$) may be the minimum inlet pressure at a control valve such as the proportional control valve 310 or mechanical regulator 250 or injector. In other embodiments, fuel sizing pressure ($P_{CV\_MIN}$) may be the pressure at the inlet of a control valve under empty pressure conditions ($P_{EMPTY}$).

In one embodiment, the primary flow 202 may pass through the control valve and enter the venturi or ejector 230 through a primary nozzle at a primary nozzle inlet pressure ($P_O$) and a primary inlet temperature ($T_O$). In other embodiments, the secondary flow 226 may enter the venturi or ejector 230 through a secondary inlet 232 in a suction chamber at a secondary inlet pressure ($P_S$) and a secondary inlet temperature ($T_S$).

In one embodiment, the venturi or ejector 230 may have exergy available in primary flow to induce the anode gas recirculated flow as the secondary flow 226 in the venturi or ejector 230. In some embodiments, the stack pressure ($\Delta P_{STACK}$) is the pressure loss through the AGR loop 224. The secondary flow 226 may be lifted against the stack pressure ($\Delta P_{STACK}$).

In one embodiment, the pressure lift ($\Delta P_{LIFT}$) is the pressure required to overcome the pressure loses in the AGR loop 224 ($\Delta P_{STACK}$). In some embodiments, the pressure lift ($\Delta P_{LIFT}$) may be dominated by the pressure losses through the fuel cell stack 210 or any other component of the AGR loop 224. In some embodiments, pressure losses may be proportional to volumetric flow rate through one or more manifolds and/or channels in the AGR loop 224. In other embodiments, the volumetric flow 222 at anode inlet 212 may include a mixture of the fresh fuel 202 and the recirculation flow 226.

In one embodiment, the secondary inlet pressure ($P_S$) may depend on the anode inlet manifold pressure ($P_{AIM}$) of the fuel cell or fuel cell stack 210 and the pressure loses in the AGR loop 224 ($\Delta P_{STACK}$) or the required pressure lift ($\Delta P_{LIFT}$).

$$P_S = P_{AIM} - \Delta P_{LIFT}$$

In one embodiment, the amount of secondary flow 226 that can be entrained is dictated by the boundary conditions of system 200/300 and the efficiency of the venturi or ejector 230. In some embodiments, the boundary conditions may be the primary nozzle inlet pressure ($P_O$), the secondary inlet pressure ($P_S$), the anode inlet manifold pressure ($P_{AIM}$) of the fuel cell or fuel cell stack 210, and/or secondary flow 226 composition. In some embodiments, the secondary flow 226 from the anode outlet 214 to the venturi or ejector inlet 232 is an adiabatic process. In other embodiments, the primary inlet temperature ($T_O$) and the secondary inlet temperature ($T_S$) of the venturi or ejector 230 may affect secondary flow 226.

In one embodiment, as described earlier, above a certain critical current density ($i_{LO\_CR}$) 130, the system 200/300 is required to operate in the target anode inlet manifold pressure range indicated by the curve 160 in FIG. 1. In some embodiments, the primary inlet pressure ($P_O$) decreases proportionally with primary fuel demand, until the primary nozzle is no longer choked (unchoked). In other embodiments, if the primary nozzle is unchoked, the rate of decrease of the primary inlet pressure ($P_O$) may be non-linear and/or sensitive to downstream pressure such as the secondary inlet pressure ($P_S$). In other embodiments, the primary inlet pressure ($P_O$) may decrease as the primary inlet temperature ($T_O$) decreases.

In one embodiment, the primary inlet temperature ($T_O$) may be equal to the fuel supply temperature ($T_{CV}$). In some embodiments, the primary inlet temperature ($T_O$) may affect the primary flow 202. In some embodiments, the system 200/300 may have a target mass flow rate. In other embodiments, the secondary inlet temperature ($T_S$) may influence the secondary flow 226 through geometric constraints of the secondary inlet 232 and/or the venturi or ejector 230. In some other embodiments, thermodynamic constraints and/or venturi or ejector 230 efficiency may influence the secondary flow 226.

In one embodiment, the venturi or ejector 230 is sensitive to the primary nozzle inlet pressure ($P_O$), the backpressure, and the required pressure lift ($\Delta P_{LIFT}$). In some embodiments, the backpressure may be exit pressure of the venturi or ejector 230 (Pc) or the anode inlet manifold pressure ($P_{AIM}$). In other embodiments, if there are no pressure losses to the anode inlet manifold from the venturi or ejector 230 outlet, the exit pressure at the venturi or ejector 230 (Pc) may be equal to the anode inlet manifold pressure ($P_{AIM}$). In some embodiment, the primary nozzle inlet pressure ($P_O$) may be a function of the current density (i) in the system 200/300.

$$P_O = f(i)$$

In one embodiment, the entrainment ratio (ER) is a measure of the performance and/or capability of the venturi or ejector 230 and may be sensitive to the primary nozzle inlet pressure ($P_O$), the backpressure (e.g., $P_C$, $P_{AIM}$) and/or the pressure lift ($\Delta P_{LIFT}$). In one embodiment, as backpressure (e.g., $P_C$, $P_{AIM}$) increases, the venturi or ejector 230 may change from being double choked (with a stable entrainment ratio), to being in a transitioning condition (with a decreasing entrainment ratio), to having a reverse flow. Reverse flow in the venturi or ejector 230 may be undesirable as reverse flow indicates no fuel recirculation through the AGR loop 224. In some embodiments, the venturi or ejector 230 may need to offset pressure losses through the fuel cell or fuel cell stack 210 ($\Delta P_{STACK}$), while operating against the backpressure (e.g., $P_C$, $P_{AIM}$).

In one embodiment, the reversible entrainment ratio (RER) or the reversible portion of the entrainment ratio (ER) based on the thermodynamic limits, is defined as:

$$RER = -\Delta_{\chi\_M} / \Delta_{\chi\_S}$$

$\Delta_{\chi\_M}$ is the motive flow exergy and $\Delta_{\chi\_S}$ is the entrained flow exergy.

In one embodiment, if the minimum and maximum anode inlet manifold pressures ($P_{AIM\_LO}$ 120 and $P_{AIM\_HI}$ 110, respectively) are known, the low break point (i.e. current density) at which the minimum anode inlet manifold pressure $P_{AIM\_LO}$ 120 ($i_{LO\_BRK}$) and the high break point (i.e. current density) at which the maximum anode inlet manifold pressure $P_{AIM\_HI}$ 110 ($i_{HI\_BRK}$) may be determined.

Figure 4A:
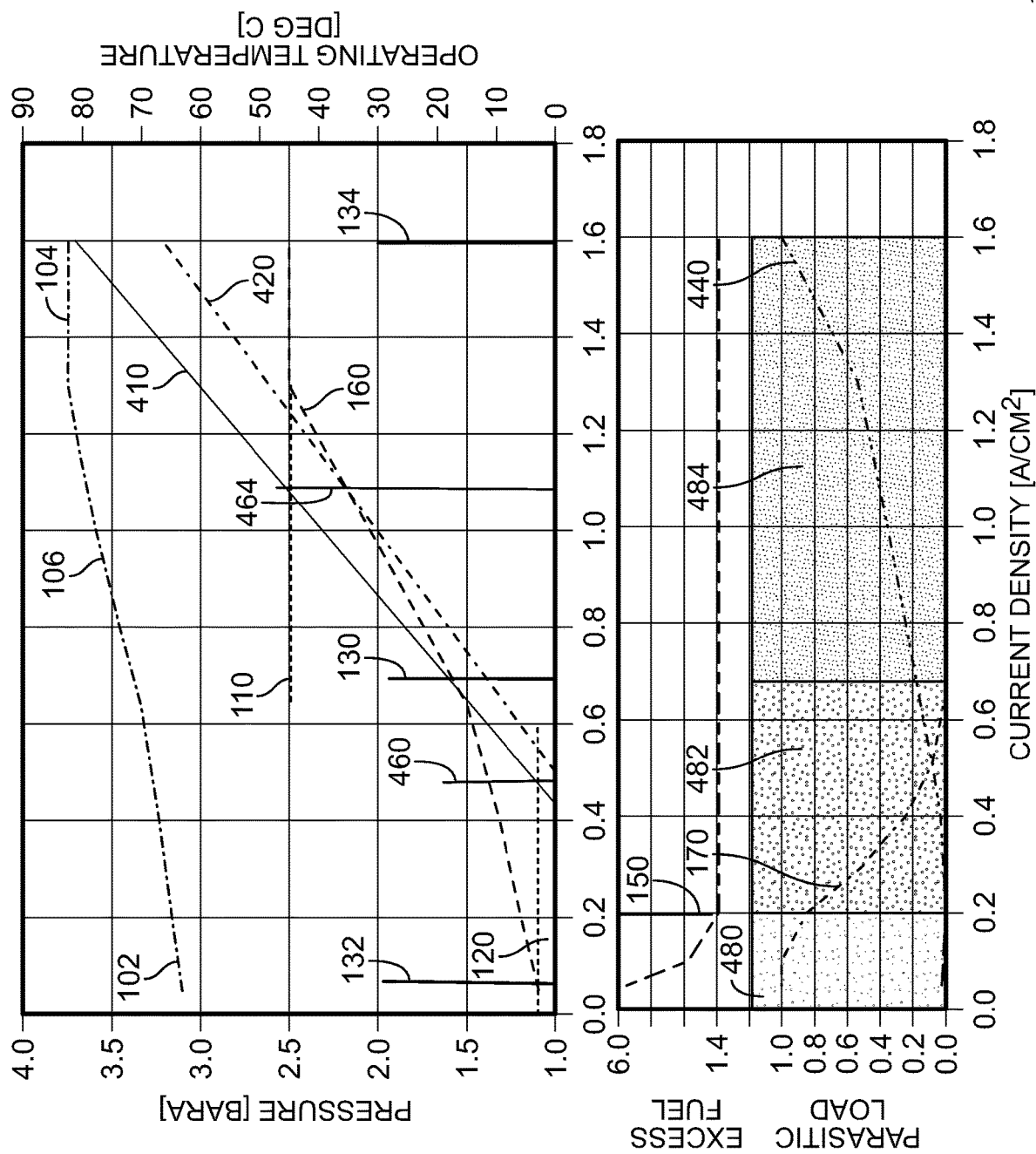
FIG. 4A is a graph showing the operating curves of as system comprising a venturi or ejector under choked conditions.
Figure 4B:
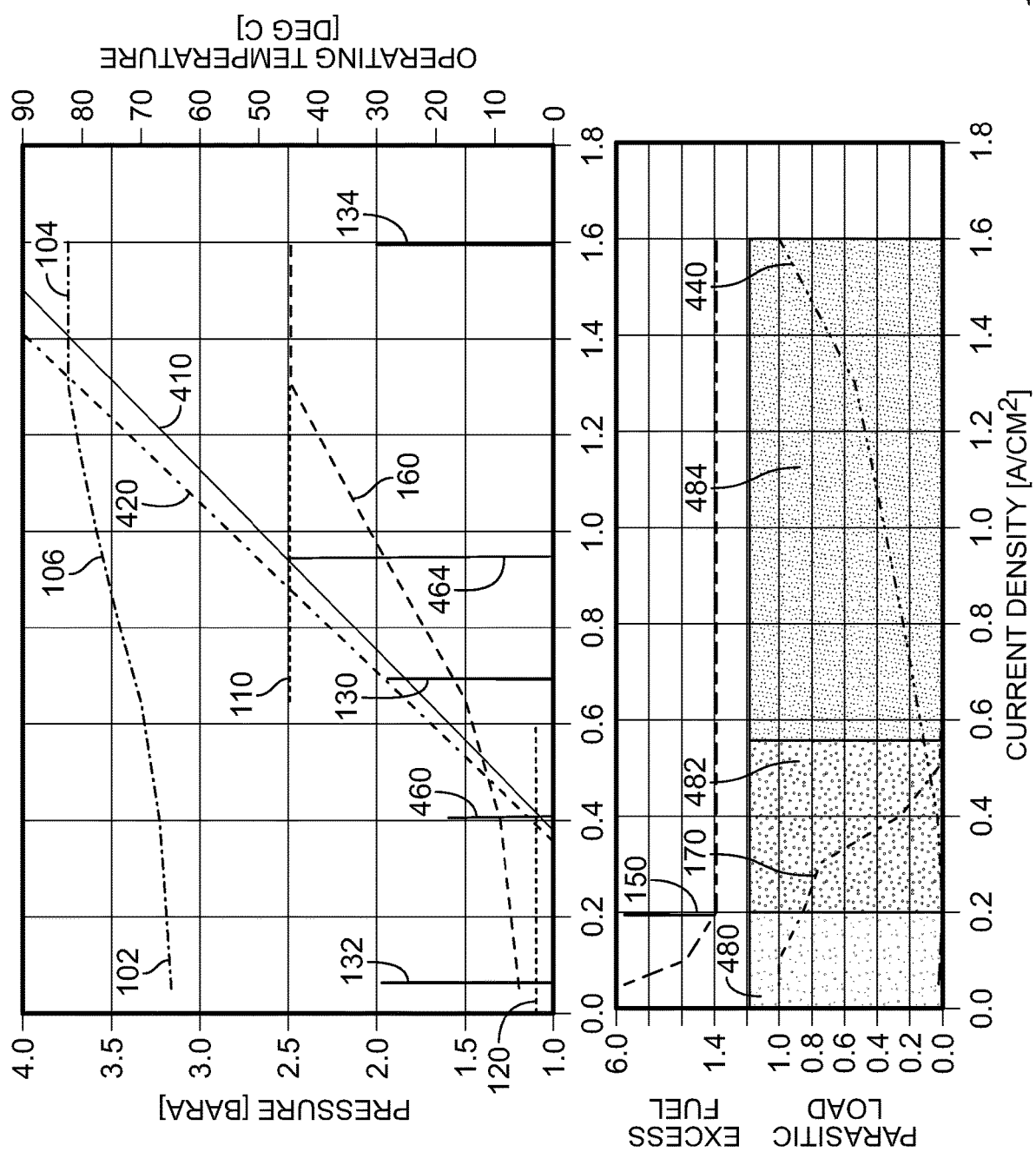
FIG. 4B is a graph showing the operating curves of as system comprising a venturi or ejector under choked and unchoked conditions.

FIG. 4A illustrates the operating range for a venturi or ejector 230 under choked conditions, and FIG. 4B illustrates the operating range for a venturi or ejector 230 under choked and unchoked conditions. In one embodiment, as shown in FIGS. 4A and B, the curve 160 indicates the target anode inlet manifold pressure range as determined by fuel cell stack design. Above a critical current density ($i_{LO\_CR}$) 130, it may be essential to operate the system 200/300 at the target anode inlet manifold pressure range which lies in the range indicated by 160. In the illustrated embodiment, the critical current density ($i_{LO\_CR}$) 130 is about 0.7 Amps/cm². The maximum anode inlet manifold pressure ($P_{AIM}$) preferred by the venturi or ejector 230 i.e. maximum ejector pressure ($P_{\_AIM\_EJCT\_MAX}$) preferred by the venturi or ejector 230 as a function of current density is shown by the curve 410. The maximum ejector pressure ($P_{\_AIM\_EJCT\_MAX}$) preferred by the venturi or ejector 230 is sensitive to the primary inlet temperature ($T_O$) as shown by the curve 420.

The maximum ejector pressure ($P_{\_AIM\_EJCT\_MAX}$) may vary according to the limits and ranges fuel supply system. In one embodiment, the current density at which the maximum ejector pressure ($P_{\_AIM\_EJCT\_MAX}$) curve 410 intersects the maximum anode inlet manifold pressures ($P_{AIM\_HI}$) 110 is defined as the high current density ejector threshold ($i_{HI\_THV}$) 464. In one embodiment, the current density at which the maximum ejector pressure ($P_{\_AIM\_EJCT\_MAX}$) curve 410 intersects the minimum anode inlet manifold pressures ($P_{AIM\_HI}$) 120 is defined as the low current density ejector threshold ($i_{LO\_THV}$) 460.

In one embodiment, if the maximum ejector pressure ($P_{\_AIM\_EJCT\_MAX}$) is greater than the anode inlet manifold pressure ($P_{AIM}$), the venturi or ejector 230 may operate under primary nozzle choked conditions, which is a robust ejector state. In some embodiments, though the venturi or ejector 230 can still entrain flow if the anode inlet manifold pressure ($P_{AIM}$) is greater than the maximum ejector pressure ($P_{\_AIM\_EJCT\_MAX}$), the venturi or ejector 230 may become more sensitive to the boundary conditions. In other embodiments, the ability of the venturi or ejector 230 to continue to meet the entrainment ratio (ER) requirements may become more sensitive to the pressure lift ($\Delta P_{LIFT}$) if the anode inlet manifold pressure ($P_{AIM}$) is greater than the maximum ejector pressure ($P_{\_AIM\_EJCT\_MAX}$).

In one embodiment, the venturi or ejector 230 configuration may be sized to fully deliver the recirculation flow 226 at the critical current density ($i_{LO\_CR}$) 130 taking into account the differential pressure across the AGR loop 224. In some embodiments, the venturi or ejector 230 configuration may be sized to fully deliver the recirculation flow 226 without the assistance of the recirculation pump or blower 220. Absence of usage of the recirculation pump or blower 220 may result in a decrease in parasitic load as shown by the curves 170 and 440. The curve 170 shows the fraction of the recirculated flow that is delivered by the recirculation pump or blower 220 and the curve 440 shows the corresponding parasitic savings. The curve 440 illustrating the parasitic savings 440 is inversely related to the curve 170 illustrating the fraction of the recirculated flow that is delivered by the recirculation pump or blower 220.

In one preferable embodiment, the venturi or ejector 230 is designed such that the venturi or ejector 230 can continue to robustly meet any entrainment ratio (ER) requirements at low current densities. In some embodiments, the venturi or ejector 230 can continue to meet entrainment ratio (ER) requirements at a current density as low as the excess fuel ratio current density threshold ($i_{\lambda\_THV}$) 150 in FIG. 4A and FIG. 4B. The benefits of a configuration where the venturi or ejector 230 can continue to meet entrainment ratio (ER) requirements at such low current densities is illustrated by the curve showing parasitic savings 440. In one embodiment, the venturi or ejector 230 and recirculation pump or blower 220 may be operated simultaneously. In other embodiments, the recirculation pump or blower 220 may be sized smaller to increase the parasitic savings and/or reduce system 200/300 cost, size, or weight.

In one embodiment, as shown in FIGS. 2 and 3, if the recirculation pump or blower 220 is upstream of the venturi or ejector 230, the flow rate (Q) through the recirculation pump or blower 220 corresponds to the recirculation flow through the anode recirculation loop 224. For example, if the entrainment ratio (ER) is equal to 2.0, then flow through the recirculation pump or blower 220 (Q) is ⅔ of the total fuel 222 flow (primary fuel flow 202+recirculation fuel flow 226).

In one embodiment, the venturi or ejector 230 and the recirculation pump or blower 220 may be optimally integrated and/or sized to enhance the operation and/or performance of the venturi or ejector 230 in the fuel cell stack 210.

In some embodiment, the recirculation pump or blower 220 may be sized to deliver pressure lift ($\Delta P_{LIFT}$) to offset any pressure losses through the anode recirculation loop 224. In other embodiments, the recirculation pump or blower 220 may be sized to support the operation and/or performance of the venturi or ejector 230 in the fuel cell stack 210 under varying operating conditions. The operating conditions may include, but may not be limited to pseudo-steady state condition and transient state or conditions.

In one embodiment, the recirculation pump or blower 220 may exist in different states of operation. In one embodiment, the recirculation pump or blower 220 may be in an idle state 484 and the venturi or ejector 230 may operate without recirculation pump or blower 220 support.

In one embodiment, the recirculation pump or blower 220 may be in a blower prime state 480, i.e. the current density may be below excess fuel ratio current density threshold ($i_{\lambda\_THV}$). Under such conditions, the performance and/or operation of the venturi or ejector 230 may be challenged and the venturi or ejector 230 may operate with recirculation pump or blower 220 support. In one embodiment, the recirculation pump or blower 220 may primarily deliver the required recirculation flow through the recirculation anode loop 224. In other embodiments, the blower pressure ($\Delta P_{BLWR}$) may adjust to provide sufficient recirculation flow fuel flow to match the fuel cell stack 210 excess fuel requirement in the system 200/300.

In one embodiment, the recirculation pump or blower 220 may be in a ejector support state 482 where the venturi or ejector 230 may be boosted by the recirculation pump or blower 220. The current density may be greater than excess fuel ratio current density threshold ($i_{\lambda\_THV}$) but less than a low break point current density at which the minimum anode inlet manifold pressure ($P_{AIM\_LO}$) 120 may be set ($i_{LO\_BRK}$). The recirculation pump or blower 220 blower may be providing a part of the recirculating flow.

Figure 5:
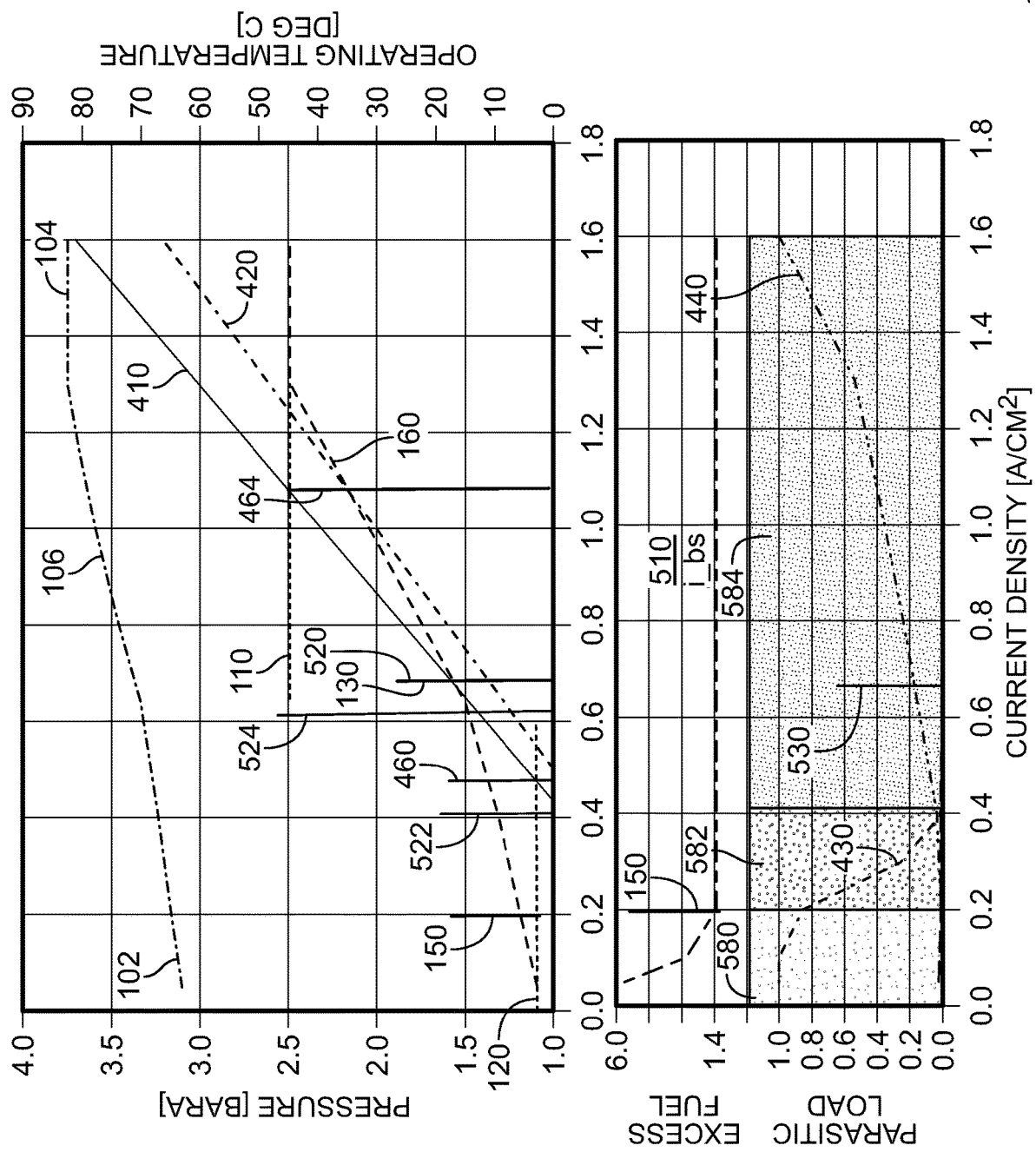
FIG. 5 a graph showing the operating curves of as system comprising a blower in different operating states when the system is in a transient state.

As shown in FIG. 5, the lowest current density at which the venturi or ejector 230 is choked at steady state operating pressure ($P_{AIM\_SS}$) is known as the lowest choked current density ($i_{LO\_ACT}$) 520. The system 200/300 may operate in a pseudo-steady state condition when the recirculation pump or blower 220 is in an idle state 484 i.e. the operating current density is greater than lowest choked current density ($i_{LO\_ACT}$) 520, or the blower is in a prime state i.e., the operating current density is much lower than the excess fuel ratio current density threshold ($i_{\lambda\_THV}$) 150, or the system 200/300 is boosted by the blower in a ejector support state 582. The system 200/300 may be operating at a current density that is greater than the excess fuel ratio current density threshold ($i_{\lambda\_THV}$) 150 but less than lowest choked current density ($i_{LO\_ACT}$) 520 when it is in the ejector support state 582. In some embodiments, the lowest choked current density ($i_{LO\_ACT}$) 520 may be equal to the critical current density ($i_{LO\_CR}$) 130.

In one embodiment, the system 200/300 may operate in a transient state or condition such as load shedding support state, where the target operating pressure ($P_{AIM}$) is greater than the steady state operating pressure ($P_{AIM\_SS}$) such that the primary inlet nozzle is not choked. In other embodiments, the system 200/300 may operate in a transient state or condition such as load accepting support state, where the rate of increase in current density (i) is greater than a certain threshold such as 0.2 Amps/cm' per second. In some embodiments, the system 200/300 may operate in a transient state or condition such as system 200/300 startup or system 200/300 shutdown. In one embodiment, the recirculation pump or blower 220 is sized such that the operation and/or performance of the venturi or ejector 230 may be increased if required. In some embodiments, this increased capability of the venturi or ejector 230 may impose higher cost and higher parasitic loads on the system 200/300.

In one embodiment, the recirculation pump or blower 220 is sized to be able to at a minimum support the system 200/300 when the recirculation pump or blower 220 is a prime state and during system 200/300 startup or system 200/300 shutdown states when the venturi or ejector 230 cannot deliver the required fuel flow rates. In other embodiments, the recirculation pump or blower 220 is sized to the differential pressure across the fuel cell stack 210 when the system 200/300 is under a transient state or condition such as load shedding support state.

In one embodiment, as shown in FIG. 5, the venturi or ejector 230 may operate without blower support at and above a blower threshold current density ($i_{BS\_THV}$) 522, the turn down ratio ($TD_{RATIO}$) that can be managed by the venturi or ejector 230 when the system 200/300 is not choked is equal is:

$$TD_{RATIO} = i_{BS\_THV}/i_{LO\_ACT}$$

The lowest current density threshold at which the venturi or ejector 230 is choked when the operating pressure ($P_{AIM}$) is the maximum operating pressure ($P_{AIM\_HI}$) 110 is the high current ejector threshold ($i_{HI\_THV}$) 464. In one embodiment, if a venturi or ejector 230 needs to operate at the maximum operating pressure ($P_{AIM\_HI}$) in a load shedding support state, then the venturi or ejector 230 may drop below a current density equal to the high current ejector threshold ($i_{HI\_THV}$) 464. The venturi or ejector 230 may not be choked at this current density. As this current density, the system 200/300 may need a recirculation pump or blower 220 to provide blower support if the operating pressure ($P_{AIM}$) remains at the maximum operating pressure ($P_{AIM\_HI}$) 110. In some embodiments, for the same turn-down ratio ($TD_{RATIO}$), recirculation pump or blower 220 support may be needed starting at a current density equal to the transition blower threshold current density ($i_{BS\_TRNS\_THV}$) 524. In other embodiments, the upper limit of the ejector support state 582 is defined by the transition blower threshold current density ($i_{BS\_TRNS\_THV}$) 524.

$$i_{BS\_TRNS\_THV} = i_{BS\_THV}/i_{LO\_ACT} \times i_{HI\_THV}$$

In one embodiment, if the venturi or ejector 230 can operate without blower support at and above a blower threshold current ($i_{BS\_THV}$) 522 equal to the excess fuel ratio current density threshold ($i_{\lambda\_THV}$) 150, $$i_{BS\_TRNS\_THV} = i_{\lambda\_THV}/i_{LO\_ACT} \times i_{HI\_THV}$$

A recirculation pump or blower 220 is sized to provide flow under conditions where the venturi or ejector 230 cannot provide all the fuel flow by itself. In one embodiment, during operation of the system 200/300 when support of the recirculation pump or blower 220 is not needed, the recirculation pump or blower 220 may act as a restriction and cause pressure loss in the anode recirculation loop 224. In some embodiments, the recirculation pump or blower 220 may need to be oversized to support the venturi or ejector 230 by decreasing the pressure lift ($\Delta P_{LIFT}$) requirement under load shedding transient state or conditions when the system 200/300 is operating at a high primary anode inlet manifold pressure (e.g., ($P_{AIM\_HI}$) 110).

In one embodiment, the recirculation pump or blower 220 may be sized proportional to the blower threshold current density ($i_{BS\_THV}$) 522 and/or the transition blower threshold current density ($i_{BS\_TRNS\_THV}$) 524. In other embodiments, the sizing of the recirculation pump or blower 220 may not be linearly proportional to the blower threshold current density ($i_{BS\_THV}$) 522 and/or the transition blower threshold current density ($i_{BS\_TRNS\_THV}$) 524. In some embodiments, the size of the recirculation pump or blower 220 may depend on the mass flow rate through the recirculation pump or blower 220.

In one embodiment, the size of the recirculation pump or blower 220 may depend on variables including but not limited to the entrainment ratio (ER) of the system 200/300, the excess fuel ratio (λ) of the system 200/300, the density of fuel composition flowing through the recirculation pump or blower 220, the density of fuel composition flowing through the fuel cell or fuel cell stack 210, the anode inlet manifold pressure ($P_{AIM}$) of the system 200/300, the operating temperature of the system 200/300, the mass flow through the system 200/300, and/or the entrained flow through the recirculation pump or blower 220.

In one embodiment, the venturi or ejector 230 may have a robust entrainment ratio (ER) because of one or more controllers of the venturi or ejector 230 and of the recirculation pump or blower 220. In some embodiments, one or more controllers of the venturi or ejector 230 and the recirculation pump or blower 220 may allow for the system 200/300 to monitor the state of the venturi or ejector 230 and start initiating and/or increasing speed of the recirculation pump or blower 220 when support is needed.

In some embodiments, the recirculation pump or blower 220 may be in an idle state 584/484 i.e. in a high load pseudo-steady state such that the current density is above the low current ejector threshold ($i_{LO\_THV}$) 460. In some embodiments, when the system 200/300 is operating at a current density above the low current ejector threshold ($i_{LO\_THV}$) 460, the venturi or ejector 230 may be capable of delivering the required entrainment ratio (ER).

In one embodiment, one or more controllers of the venturi or ejector 230 and of the recirculation pump or blower 220 may allow for the system 200/300 to monitor the state of the venturi or ejector 230 and start initiating and/or increasing speed of the recirculation pump or blower 220 when support is needed. In some embodiment, there may be a mismatch between pressure provided by the recirculation pump or blower 220 and the pressure needed by the venturi or ejector 230 during recirculation pump or blower 220 start up and/or shut down.

In one embodiment, the one or more controller for monitoring and/or controlling the operation of the venturi or ejector 230, and/or the recirculation pump or blower 220 in a system 200/300 may be implemented, in some cases, in communication with hardware, firmware, software, or any combination thereof present on or outside the in a system 200/300 comprising the fuel cell or fuel cell stack 210. Information may be transferred to the one or more controllers using any one or more communication technology (e.g., wired or wireless communications) and associated protocols (e.g., Ethernet, InfiniBand®, Wi-Fi®, Bluetooth®, WiMAX, 3G, 4G LTE, 5G, etc.) to effect such communication.

In one embodiment, the one or more controller may be in a computing device. The computing device may be embodied as any type of computation or computer device capable of performing the functions described herein, including, but not limited to, a server (e.g., stand-alone, rack-mounted, blade, etc.), a network appliance (e.g., physical or virtual), a high-performance computing device, a web appliance, a distributed computing system, a computer, a processor-based system, a multiprocessor system, a smartphone, a tablet computer, a laptop computer, a notebook computer, and a mobile computing device.

The computing device may include an input/output (I/O) subsystem, a memory, a processor, a data storage device, a communication subsystem, a controller, and a display. The computing device may include additional and/or alternative components, such as those commonly found in a computer (e.g., various input/output devices), in other embodiments. In other embodiments, one or more of the illustrative components may be incorporated in, or otherwise form a portion of, another component. For example, the memory, or portions thereof, may be incorporated in the processor.

In one embodiment, the system 200/300 may operate in a transient state such as load shedding state, start-up state, or shut down state. In some embodiments, the system 200/300 may operate in a transient lag state such that the pressure or temperature of the fuel cell or fuel cell stack 210 may be lagging the pressure or temperature fuel cell or fuel cell stack 210 in the transient state. For example, in some embodiments, during transient state, the system 200/300 may be in a transient lag state where the system is able to support the required current density of the transient state or conditions, but the fuel cell or fuel cell stack 210 operating temperature may take time to decrease.

In one embodiment, the system 200/300 may maintain the current density generation to be above a minimum current density while the fuel cell operating temperature may be decreased. In some embodiments, the minimum current density may be the current density at the transient break point ($i_{TRS\_BRK}$). Targeting a minimum density during transient operations may circumvent the need for a large recirculation pump or blower 220.

In one embodiment, when the system 200/300 is in the transient lag state, the system 200/300 may enter a zone where the venturi or ejector 230 along with the recirculation pump or blower 220 is not able to support the required current density. In some embodiments, the one or more controllers of the venturi or ejector 230 and of the recirculation pump or blower 220 may choose to operate the system 200/300 at a current density higher than the required current density so that the system 200/300 produces more energy than required. In other embodiments, the one or more controllers of the venturi or ejector 230 and of the recirculation pump or blower 220 may choose to operate the system 200/300 at a current density lower than the required current density so that the system 200/300 produces less energy than required.

In one embodiment, if the system 200/300 is operating at a current density lower than the required current density, the system 200/300 may use energy from a storage device such as a battery to provide the required current density. In some embodiments, the system may use energy from supercapacitors, superconductors, via Li-ion batteries, lead-acid batteries, flywheels, compressed air, or phase change materials.

In one embodiment, if the system 200/300 is operating at a current density higher than the required current density, the extra power generated in maintaining the current density generation to be above the required current density may be transferred to be stored in an energy storage device such as a battery. In some embodiments, the extra power may be stored as potential or kinetic energy. For example, the extra power may be stored as electrical energy via supercapacitors and/or superconductors, as electrochemical energy via Li-ion batteries, and/or lead-acid batteries, as mechanical energy via flywheels and/or compressed air, or as thermal energy via phase change materials.

In one embodiments, the extra power generated may be consumed by increasing parasitic loads. For example, the vehicle system cooling fan load may be increased by spinning the cooling fan faster, air compressor load may be increased by increasing by-pass air flow around the fuel cell or fuel cell stack. In other embodiments, the energy may be dissipated as heat (e.g., through an electrical resistor).

In one embodiment, if the system includes multiple fuel cell stacks, the system may choose to operate one set of fuel cell stacks at an upper threshold of system power need, and the remainder at a lower threshold of system power need, such that the total power generated meets the required power demand. For example, a system may include two equal sized stacks. Under load shedding condition where the recirculation pump or blower 220 is not capable of operating, and when the power demand is half way between the upper threshold and lower threshold, the system may choose to operate one stack at the lower threshold and the other stack at the upper threshold. The net power generated by the system meets the power demand, so there may be no need to store additional power generated. In some embodiments, if the power generated by the system is more than the demand, the additional power may be stored. In other embodiments, if the power generated by the system is less than the demand, stored power may be used by the system.

In one embodiment, the system 200/300 may comprise the battery used to store the extra power. In other embodiments, the battery used to store the extra power may be external to the system 200/300. In some embodiments, the power generated may be transferred through a physical entity such as a wire. In other embodiments, the power generated may be transferred wirelessly. In some embodiments, the state of charge (SOC) of the battery may determine the ability of the system 200/300 transfer any power generated to the battery and/or the ability to store energy in the battery.

In one embodiment, the power generated at a transient state or condition is:

$$Power\_{TRANSIENT} = I\_{TRANSIENT} \times V\_{TRANSIENT}$$

In one embodiment, the energy generated over a time period ($\Delta t$) is:

$$Energy\_{TRANSIENT} = I\_{TRANSIENT} \times V\_{TRANSIENT} \times \Delta t$$

$V\_{TRANSIENT}$ is the total voltage of the fuel cells comprised in fuel stack 210, and $I\_{TRANSIENT}$ is the total current density at a transient state or condition. In one embodiment, the fuel stack 210 of the system 200/300 may comprise about 150 to about 250 fuel cells, about 250 to about 450 fuel cells, or about 350 to about 650 fuel cells, including every number of fuel cells comprised therein. In other embodiment, the fuel stack 210 of the system 200/300 may comprise less than 150 fuel cells or more than 450 fuel cells.

In one embodiment, if the voltage of a single fuel cell is about 0.8 V, and the fuel cell stack 210 comprises about 320 fuel cells, the total voltage of the fuel cell stack 210 is:

$$V\_{TRANSIENT} = 0.8 \times 320 = 256 V$$

In one embodiment, the total current density at a transient state or condition ($I\_{TRANSIENT}$) depends on the area of the fuel cell stack 210 and the current density at a transient state. The area of the fuel cell stack 210 may depends on the various operating conditions and/or power generation requirements of the system 200/300. In one embodiment, if the area of the fuel cell stack 210 is about 608 cm², the current density at the transient break point ($i\_{TRS\_BRK}$) is about 0.25 Amps/cm², the total current density at a transient state or condition ($I\_{TRANSIENT}$) is:

$$I\_{TRANSIENT} = 0.25 \times 608 = 152 \text{ Amps}$$

In one embodiment, the area of a fuel cell stack may range from about 50 cm² to about 1000 cm², from about 350 cm² to about 500 cm², or from about 500 cm² to about 900 cm², including every size comprised therein.

In one embodiment, the system 200/300 may be in the transient state for less than 5 seconds. The power generated over the time period the system is in a transient state or condition (e.g., 5 s) is:

$$Power\_{TRANSIENT} = I\_{TRANSIENT} \times V\_{TRANSIENT} = 38.9 \text{ kW}$$

$$Energy\_{TRANSIENT} = I\_{TRANSIENT} \times V\_{TRANSIENT} \times \Delta t = 0.54 \text{ kWh}$$

In some embodiments, the system 200/300 may be in the transient state or condition for about 2 seconds to about 5 second, from about 5 seconds to about 10 seconds, from about 10 seconds to about 20 seconds, including every duration of time comprised therein.

In one embodiment if the demand current density ($i\_{DEMAND}$) is zero, the total power generated at the current density at the transient break point ($i\_{TRS\_BRK}$) may be stored in the battery. In some embodiments, the total power generated at the current density at the transient break point ($i\_{TRS\_BRK}$) may be stored in the battery if the state of charge (SOC) of the battery allows for energy storage.

In one embodiment, the primary anode inlet manifold pressure ($P\_{AIM}$) may be in the transient state or condition for the duration that the system 200/300 may be in the transient state or condition. In some embodiments, the current density at the transient break point ($i\_{TRS\_BRK}$) may be proportional to the transient primary anode inlet manifold pressure ($P\_{AIM\_TRS}$). In some embodiments, the energy produced during the transient state or transient lag state may depend on the number of fuel cell stacks being used. A single fuel cell stack may produce about 0.0025 kWh to about 2 kWh of energy. A small fuel cell stack may produce about 0.0025 kWh to about 0.05 kWh of energy. A mid-sized fuel cell stack may produce about 0.05 kWh to about 1 kWh of energy. A large fuel cell stack may produce about 1 kWh to about 2 kWh of energy In one embodiment, if there about 100 fuel cells of about 400 cm² area in a fuel cell stack being used at a current (i) of 0.6 Amps/cm² and a voltage of 0.6 V for 1 s, the energy produced is about 0.004 kWh per fuel stack. In another embodiment, if there about 420 fuel cells in a fuel cell stack of about 500 cm² area being used at a current (i) of 0.8 Amps/cm² and a voltage of 0.8 V for 5 s, the energy produced is about 0.2 kWh per fuel stack. In a further embodiment, if there about 650 fuel cells in a fuel cell stack of about 900 cm² area being used at a current (i) of 1 Amps/cm² and a voltage of 0.8 V for 10 s, the energy produced is about 1.3 kWh per fuel stack.

In one embodiment, the current density at the transient break point ($i\_{TRS\_BRK}$) may slowly decrease. In some embodiments, if the energy storage device in the system 200/300 does not have available storage, the system 200/300 may not deliver the required current as additional storage may not be possible. In some embodiments, electrical energy or wasted heat from the fuel cell or fuel cell stack 210 may be diverted to a heater or other heat storage/usage equipment such as electrical resistors. In other embodiments, heat from the heater other heat storage/usage equipment such as electrical resistor heating or heat exchangers may be used to heat the primary inlet temperature ($T_O$). In some embodiments, if the primary inlet temperature ($T_O$) were heated, the primary nozzle inlet pressure ($P_O$) may need to increase to compensate for the change in temperature. In some embodiments, the compensation may reduce the size of the recirculation pump or blower 220 required for the entrainment ratio (ER). In some embodiments, flow in the cathode air side may be managed depending on the operating current density. For example, the air flow may be managed to ensure humidified state is preserved at the upper and lower operating current densities when the system 200/300 is operating in the transient state or transient lag state.

The following numbered embodiments are contemplated and are non-limiting:

1. A fuel cell stack system comprising an ejector, wherein the system is operating in a transient lag state and the system is required to operate at a first operating current density that the ejector cannot support, and wherein the system operates at a second operating current density.
2. The fuel cell stack system of clause 1, any other suitable clause, or any combination of suitable clauses, comprising a blower, wherein the system is operating in a transient lag state and the system is required to operate at a first operating current density that the ejector cannot support, and wherein the system operates at a second operating current density.
3. The fuel cell stack system of clause 1, any other suitable clause, or any combination of suitable clauses, wherein temperature or pressure of the fuel cell stack is being decreased while the system is operating in the transient lag state.
4. The fuel cell stack system of clause 1, any other suitable clause, or any combination of suitable clauses, comprising a controller, wherein the controller determines the second operating current density for the system.
5. The fuel cell stack system of clause 4, any other suitable clause, or any combination of suitable clauses, wherein the second operating current density is higher than the first operating current density.
6. The fuel cell stack system of clause 4, any other suitable clause, or any combination of suitable clauses, wherein the system generates excess power when operating at the second operating current density.
7. The fuel cell stack system of clause 1, any other suitable clause, or any combination of suitable clauses, wherein the system generates excess power, and wherein the excess power generated is dissipated or stored over a period of time in an energy storage device.
8. The fuel cell stack system of clause 7, any other suitable clause, or any combination of suitable clauses, wherein the energy storage device is a supercapacitor, superconductor, Li-ion battery, lead-acid battery, flywheels, compressed air, or a phase change material.
9. The fuel cell stack system of clause 7, any other suitable clause, or any combination of suitable clauses, wherein the energy storage device is a battery with a state of charge.
10. The fuel cell stack system of clause 1, any other suitable clause, or any combination of suitable clauses, wherein the system generates excess power, and wherein storage of the excess power generated depends on the state of charge of a battery.
11. The fuel cell stack system of clause 1, any other suitable clause, or any combination of suitable clauses, wherein the system generates excess power, and wherein the excess power is stored as kinetic energy, potential energy, chemical energy, electrical energy, electrochemical energy, mechanical energy, or thermal energy.
12. The fuel cell stack system of clause 1, any other suitable clause, or any combination of suitable clauses, comprising a controller, wherein the controller determines a second operating current density for the system, and a third operating current density for the system, and wherein the third operating current density is lower than the first operating current density.
13. The fuel cell stack system of clause 12, any other suitable clause, or any combination of suitable clauses, wherein the system uses energy from an energy storage device when operating at the third operating current density.
14. The fuel cell stack system of clause 1, any other suitable clause, or any combination of suitable clauses, wherein the system is operating the transient lag state following a transient state such as load shedding support state, where the target operating pressure ($P_{AIM}$) is greater than the steady state operating pressure ($P_{AIM\_SS}$) such that the primary inlet nozzle is not choked.
15. The fuel cell stack system of clause 1, any other suitable clause, or any combination of suitable clauses, wherein the system is operating the transient lag state following a transient state such as load accepting support state, where the rate of increase in current density (i) is greater than a certain threshold such as 0.2 Amps/cm$^2$ per second.
16. The fuel cell stack system of clause 1, any other suitable clause, or any combination of suitable clauses, wherein the system is operating the transient lag state following a transient state such as system startup or system shutdown.
17. The fuel cell stack system of clause 1, any other suitable clause, or any combination of suitable clauses, wherein the system is operating at a first current density higher than a required current density so that the system produces more energy than required.
18. The fuel cell stack system of clause 1, any other suitable clause, or any combination of suitable clauses, wherein the system is operating at a first current density lower than a required current density so that the system produces less energy than required.
19. The fuel cell stack system of clause 1, any other suitable clause, or any combination of suitable clauses, wherein the system generates extra power, and the extra power generated is consumed by increasing parasitic loads.
20. The fuel cell stack system of clause 1, any other suitable clause, or any combination of suitable clauses, wherein the system generates extra power, and the extra power generated is consumed by a vehicle system cooling fan or an air compressor.
21. The fuel cell stack system of clause 1, any other suitable clause, or any combination of suitable clauses, wherein the system the system generates extra power, and the extra power generated is dissipated as heat.
22. The fuel cell stack system of clause 1, any other suitable clause, or any combination of suitable clauses, wherein the system includes multiple fuel cell stacks.
23. The fuel cell stack system of clause 1, any other suitable clause, or any combination of suitable clauses, wherein the system operates one set of fuel cell stacks at an upper threshold of system power need, and the remainder at a lower threshold of system power need, such that the total power generated meets the required power demand.

24. The fuel cell stack system of clause 1, any other suitable clause, or any combination of suitable clauses, wherein power generated at a transient state or at the transient lag state is:

$$\text{Power}_{\_TRANSIENT} = I_{\_TRANSIENT} \times V_{\_TRANSIENT}$$

$V_{\_TRANSIENT}$ is the total voltage of the fuel cells comprised in fuel stack system, and $I_{\_TRANSIENT}$ is the total current density at the transient state.

25. The fuel cell stack system of clause 1, any other suitable clause, or any combination of suitable clauses, wherein energy generated over a time period ($\Delta t$) is:

$$\text{Energy}_{\_TRANSIENT} = I_{\_TRANSIENT} \times V_{\_TRANSIENT} \times \Delta t$$

$V_{\_TRANSIENT}$ is the total voltage of the fuel cells comprised in fuel stack system, and $I_{\_TRANSIENT}$ is the total current density at a transient state.

26. The fuel cell stack system of clause 1, any other suitable clause, or any combination of suitable clauses, wherein if a demand current density ($i_{\_DEMAND}$) is zero, total power generated at a current density at a transient break point ($i_{\_TRS\_BRK}$) may be stored in a battery.

27. The fuel cell stack system of clause 26, any other suitable clause, or any combination of suitable clauses, wherein the current density at the transient break point ($i_{\_TRS\_BRK}$) slowly decreases.

28. The fuel cell stack system of clause 1, any other suitable clause, or any combination of suitable clauses, wherein the system comprises an energy storage device, and if the energy storage device does not have available storage, the system does not deliver a required current as additional storage is not possible.

29. The fuel cell stack system of clause 1, any other suitable clause, or any combination of suitable clauses, wherein electrical energy or wasted heat from the system is diverted to a heater or other heat storage/usage equipment such as electrical resistors.

30. The fuel cell stack system of clause 1, any other suitable clause, or any combination of suitable clauses, wherein heat from a heater other heat storage/usage equipment such as electrical resistor heating or heat exchangers is used to heat the system's primary inlet temperature ($T_O$).

31. The fuel cell stack system of clause 1, any other suitable clause, or any combination of suitable clauses, wherein if the system's primary inlet temperature ($T_O$) were heated, a primary nozzle inlet pressure ($P_O$) is increased to compensate for the change in temperature.

32. The fuel cell stack system of clause 31, any other suitable clause, or any combination of suitable clauses, wherein compensation may reduce the size of a blower required for the entrainment ratio (ER).

33. The fuel cell stack system of clause 1, any other suitable clause, or any combination of suitable clauses, wherein flow in the cathode side may be managed depending on the operating current density.

34. The fuel cell stack system of clause 1, any other suitable clause, or any combination of suitable clauses, wherein air flow is managed to ensure humidified state is preserved at the upper and lower operating current densities when the system is operating in the transient lag state.

35. The fuel cell stack system of clause 1, any other suitable clause, or any combination of suitable clauses, wherein the ejector is sized to fully deliver a recirculation flow at the critical current density ($i_{\_LO\_CR}$).

36. The fuel cell stack system of clause 1, any other suitable clause, or any combination of suitable clauses, wherein the ejector is sized to fully deliver a recirculation without the assistance of a blower.

37. The fuel cell stack system of clause 1, any other suitable clause, or any combination of suitable clauses, wherein the system further comprises a blower optimally integrated and/or sized to enhance the operation and/or performance of the ejector.

38. The fuel cell stack system of clause 1, any other suitable clause, or any combination of suitable clauses, wherein the system further comprises a blower sized to deliver pressure lift ($\Delta P_{LIFT}$) to offset any pressure losses through an anode recirculation loop.

39. The fuel cell stack system of clause 1, any other suitable clause, or any combination of suitable clauses, wherein the transient lag state follows a pseudo-steady state or a transient state.

40. The fuel cell stack system of clause 1, any other suitable clause, or any combination of suitable clauses, wherein the system further comprises a blower operating in an idle state, in a blower prime state, or in an ejector support state.

41. The fuel cell stack system of clause 1, any other suitable clause, or any combination of suitable clauses, wherein absence of usage of a blower results in a decrease in parasitic load.

42. The fuel cell stack system of clause 1, any other suitable clause, or any combination of suitable clauses, wherein the system comprises a humidification device.

43. The fuel cell stack system of clause 42, any other suitable clause, or any combination of suitable clauses, wherein a target relative humidity (RH) may be maintained by using a humidification device in combination with the operating pressure and operating temperature.

44. The fuel cell stack system of clause 1, any other suitable clause, or any combination of suitable clauses, wherein the system comprises a mechanical regulator, a proportional control valve, or an injector.

45. A method of operating a fuel cell stack system comprising:
    operating the fuel cell stack in a transient lag state,
    determining a first operating current density of the system that is a required operating current density of the system, and that an ejector cannot support,
    determining a second operating current density of the system,
    operating the system at the second operating current density.

46. The method of clause 45, any other suitable clause, or any combination of suitable clauses, wherein the system further comprises a blower, and wherein the ejector or the blower cannot support the first operating current density.

47. The method of clause 45, any other suitable clause, or any combination of suitable clauses, wherein temperature or pressure of the fuel cell stack is being decreased while the system is operating in the transient lag state.

48. The method of clause 45, any other suitable clause, or any combination of suitable clauses, wherein the system further comprises a controller, wherein the controller determines the second operating current density for the system.

49. The method of clause 45, any other suitable clause, or any combination of suitable clauses, wherein the second operating current density is higher than the first operating current density.

50. The method of clause 45, any other suitable clause, or any combination of suitable clauses, wherein the system generates excess power when operating at the second operating current density.
51. The method of clause 45, any other suitable clause, or any combination of suitable clauses, wherein the system generates excess power, and wherein the excess power generated is dissipated or stored over a period of time in an energy storage device.
52. The method of clause 51, any other suitable clause, or any combination of suitable clauses, wherein the energy storage device is a supercapacitor, superconductor, Li-ion battery, lead-acid battery, flywheels, compressed air, or a phase change material.
53. The method of clause 51, any other suitable clause, or any combination of suitable clauses, wherein the energy storage device is a battery with a state of charge.
54. The method of clause 45, any other suitable clause, or any combination of suitable clauses, wherein the system generates excess power, and wherein storage of the excess power generated depends on the state of charge of a battery.
55. The method of clause 45, any other suitable clause, or any combination of suitable clauses, wherein the system generates excess power, and wherein the excess power is stored as kinetic energy, potential energy, chemical energy, electrical energy, electrochemical energy, mechanical energy, or thermal energy.
56. The method of clause 45, any other suitable clause, or any combination of suitable clauses, comprising a controller, wherein the controller determines a second operating current density for the system, and a third operating current density for the system, and wherein the third operating current density is lower than the first operating current density.
57. The method of clause 56, any other suitable clause, or any combination of suitable clauses, wherein the system uses energy from an energy storage device when operating at the third operating current density.
58. The method of clause 45, any other suitable clause, or any combination of suitable clauses, wherein the system is operating the transient lag state following a transient state such as load shedding support state, where the target operating pressure ($P_{AIM}$) is greater than the steady state operating pressure ($P_{AIM\_SS}$) such that the primary inlet nozzle is not choked.
59. The method of clause 45, any other suitable clause, or any combination of suitable clauses, wherein the system is operating the transient lag state following a transient state such as load accepting support state, where the rate of increase in current density (i) is greater than a certain threshold such as 0.2 Amps/cm² per second.
60. The method of clause 45, any other suitable clause, or any combination of suitable clauses, wherein the system is operating the transient lag state following a transient state such as system startup or system shutdown.
61. The method of clause 45, any other suitable clause, or any combination of suitable clauses, wherein the system is operating at a first current density higher than a required current density so that the system produces more energy than required.
62. The method of clause 45, any other suitable clause, or any combination of suitable clauses, wherein the system is operating at a first current density lower than a required current density so that the system produces less energy than required.
63. The method of clause 45, any other suitable clause, or any combination of suitable clauses, wherein the system generates extra power, and the extra power generated is consumed by increasing parasitic loads.
64. The method of clause 45, any other suitable clause, or any combination of suitable clauses, wherein the system generates extra power, and the extra power generated is consumed by a vehicle system cooling fan or an air compressor.
65. The method of clause 45, any other suitable clause, or any combination of suitable clauses, wherein the system the system generates extra power, and the extra power generated is dissipated as heat.
66. The method of clause 45, any other suitable clause, or any combination of suitable clauses, wherein the system includes multiple fuel cell stacks.
67. The method of clause 45, any other suitable clause, or any combination of suitable clauses, wherein the system operates one set of fuel cell stacks at an upper threshold of system power need, and the remainder at a lower threshold of system power need, such that the total power generated meets the required power demand
68. The method of clause 45, any other suitable clause, or any combination of suitable clauses, wherein power generated at a transient state or at the transient lag state is:

$$\text{Power}_{\_TRANSIENT} = I_{\_TRANSIENT} \times V_{\_TRANSIENT}$$

$V_{\_TRANSIENT}$ is the total voltage of the fuel cells comprised in fuel stack system, and $I_{\_TRANSIENT}$ is the total current density at the transient state.
69. The method of clause 45, any other suitable clause, or any combination of suitable clauses, wherein energy generated over a time period ($\Delta t$) is:

$$\text{Energy}_{\_TRANSIENT} = I_{\_TRANSIENT} \times V_{\_TRANSIENT} \times \Delta t$$

$V_{\_TRANSIENT}$ is the total voltage of the fuel cells comprised in fuel stack system, and $I_{\_TRANSIENT}$ is the total current density at a transient state.
70. The method of clause 45, any other suitable clause, or any combination of suitable clauses, wherein if a demand current density ($i_{\_DEMAND}$) is zero, total power generated at a current density at a transient break point ($i_{\_TRS\_BRK}$) may be stored in a battery.
71. The method of clause 70, any other suitable clause, or any combination of suitable clauses, wherein the current density at the transient break point ($i_{\_TRS\_BRK}$) slowly decreases.
72. The method of clause 45, any other suitable clause, or any combination of suitable clauses, wherein the system comprises an energy storage device, and if the energy storage device does not have available storage, the system does not deliver a required current as additional storage is not possible.
73. The method of clause 45, any other suitable clause, or any combination of suitable clauses, wherein electrical energy or wasted heat from the system is diverted to a heater or other heat storage/usage equipment such as electrical resistors.
74. The method of clause 45, any other suitable clause, or any combination of suitable clauses, wherein heat from a heater other heat storage/usage equipment such as electrical resistor heating or heat exchangers is used to heat the system's primary inlet temperature ($T_O$).
75. The method of clause 45, any other suitable clause, or any combination of suitable clauses, wherein if the system's primary inlet temperature ($T_O$) were heated, a primary nozzle inlet pressure ($P_O$) is increased to compensate for the change in temperature.

76. The method of clause 45, any other suitable clause, or any combination of suitable clauses, wherein compensation may reduce the size of a blower required for the entrainment ratio (ER).
77. The method of clause 45, any other suitable clause, or any combination of suitable clauses, wherein flow in the cathode side may be managed depending on the operating current density.
78. The method of clause 45, any other suitable clause, or any combination of suitable clauses, wherein air flow is managed to ensure humidified state is preserved at the upper and lower operating current densities when the system is operating in the transient lag state.
79. The method of clause 45, any other suitable clause, or any combination of suitable clauses, wherein the ejector is sized to fully deliver a recirculation flow at the critical current density ($i_{LO\_CR}$).
80. The method of clause 45, any other suitable clause, or any combination of suitable clauses, wherein the ejector is sized to fully deliver a recirculation without the assistance of a blower.
81. The method of clause 45, any other suitable clause, or any combination of suitable clauses, wherein the system further comprises a blower optimally integrated and/or sized to enhance the operation and/or performance of the ejector.
82. The method of clause 45, any other suitable clause, or any combination of suitable clauses, wherein the system further comprises a blower sized to deliver pressure lift ($\Delta P_{LIFT}$) to offset any pressure losses through an anode recirculation loop.
83. The method of clause 45, any other suitable clause, or any combination of suitable clauses, wherein the transient lag state follows a pseudo-steady state or a transient state.
84. The method of clause 45, any other suitable clause, or any combination of suitable clauses, wherein the system further comprises a blower operating in an idle state, in a blower prime state, or in an ejector support state.
85. The method of clause 45, any other suitable clause, or any combination of suitable clauses, wherein absence of usage of a blower results in a decrease in parasitic load.
86. The method of clause 45, any other suitable clause, or any combination of suitable clauses, wherein the system comprises a humidification device.
87. The fuel cell stack system of clause 42, any other suitable clause, or any combination of suitable clauses, wherein a target relative humidity (RH) may be maintained by using a humidification device in combination with the operating pressure and operating temperature.
88. The method of clause 45, any other suitable clause, or any combination of suitable clauses, wherein the system comprises a mechanical regulator, a proportional control valve, or an injector.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that other embodiments may be utilized and that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated.

Furthermore, references to "one embodiment" of the presently described subject matter are not intended to be interpreted as excluding the existence of additional embodiments that also incorporate the recited features. Specified numerical ranges of units, measurements, and/or values include, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first", "second", "third", and the like, as used herein do not denote any order or importance, but rather are used to distinguish one element from another. The term "or" and "and/or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising", "including", or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps. The phrase "consisting of" or "consists of" refers to a compound, composition, formulation, or method that excludes the presence of any additional elements, components, or method steps.

The term "consisting of" also refers to a compound, composition, formulation, or method of the present disclosure that excludes the presence of any additional elements, components, or method steps. The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A fuel cell stack system, comprising:
   a fuel cell stack, an ejector, a blower, and an energy storage device,
   wherein the fuel cell stack system is configured to operate at a first pressure or a first temperature in a transient lag state that is higher than a second pressure or a second temperature in a transient state, respectively, and wherein a controller is configured to operate the fuel cell stack system at a second operating current density when the fuel cell stack system is required to operate at a first operating current density.

2. The system of claim 1, wherein the first operating current density is a current density at a transient break point.

3. The system of claim 1, wherein the second operating current density is higher than the first operating current density.

4. The system of claim 3, wherein the system generates an excess power at the second operating current density, and wherein the excess power generated is dissipated or stored over a period of time in the energy storage device.

5. The system of claim 4, wherein the energy storage device is a battery with a state of charge.

6. The system of claim 5, wherein storage of the excess power depends on the state of charge of the battery.

7. The system of claim 4, wherein the excess power is stored as kinetic energy, potential energy, chemical energy, electrical energy, electrochemical energy, mechanical energy, or thermal energy.

8. The system of claim 3, wherein the controller is configured to determines a third operating current density, and the third operating current density is lower than the first operating current density.

9. The system of claim 8, wherein the system uses energy from the energy storage device when operating at the third operating current density.

10. A method for operating a fuel cell stack system comprising:
    operating the fuel cell stack system including an ejector or a blower in a fuel cell stack in a transient lag state,
    determining a first operating current density of the system that the ejector or the blower cannot support,
    determining a second operating current density of the system,
    decreasing a temperature of a pressure of the system while the system is operating in the transient lag state before operating in a transient state,
    operating the system at the second operating current density, wherein the second operating current density is higher than the first operating current density.

11. The method of claim 10, wherein the first operating current density is a current density at a transient break point.

12. The method of claim 10, further comprising the fuel cell stack system generating an excess power when operating at the second operating current density, and dissipating the excess power or storing the excess power over a period of time in an energy storage device.

13. The method of claim 12, wherein the energy storage device is a battery with a state of charge.

14. The method of claim 13, wherein storing the excess power depends on a state of charge of the battery.

15. The method of claim 12, wherein the excess power is stored as kinetic energy, potential energy, chemical energy, electrical energy, electrochemical energy, mechanical energy, or thermal energy.

16. The method of claim 10, further comprising a controller determining a third operating current density for the system, and wherein the third operating current density is lower than the first operating current density.

17. The method of claim 16, further comprising the fuel cell stack system using energy from an energy storage device when operating at the third operating current density.

18. The method of claim 10, wherein the first operating current density is higher than a required operating current density so that the fuel cell stack system produces more energy than required.

19. The method of claim 10, further comprising operating a multiple number of fuel cell stacks according to a system power need.

20. The method of claim 12, further comprising consuming the excess power by a parasitic load.

* * * * *